United States Patent
Kato et al.

(10) Patent No.: US 8,666,413 B2
(45) Date of Patent: Mar. 4, 2014

(54) BASE STATION AND HANDOVER CONTROL METHOD

(75) Inventors: Yasuhiro Kato, Yokohama (JP); Wuri Andarmawanti Hapsari, Yokosuka (JP); Masayuki Motegi, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 294 days.

(21) Appl. No.: 12/279,344

(22) PCT Filed: Feb. 26, 2007

(86) PCT No.: PCT/JP2007/053554
§ 371 (c)(1),
(2), (4) Date: Nov. 3, 2008

(87) PCT Pub. No.: WO2007/099920
PCT Pub. Date: Sep. 7, 2007

(65) Prior Publication Data
US 2009/0170515 A1    Jul. 2, 2009

(30) Foreign Application Priority Data
Feb. 27, 2006  (JP) .................................. 2006-050435

(51) Int. Cl.
*H04W 36/00*  (2009.01)

(52) U.S. Cl.
USPC ........... 455/436; 455/561; 455/439; 455/515; 455/560; 455/422.1; 455/442

(58) Field of Classification Search
USPC ......... 455/436, 442, 438, 560, 561, 509, 517, 455/448, 437, 450, 522, 453, 423, 226.2, 455/440; 370/331, 342, 335, 468, 315, 328, 370/237, 252, 394, 401, 338, 345, 329
See application file for complete search history.

(56) References Cited

U.S. PATENT DOCUMENTS

| 6,134,444 | A  | * | 10/2000 | Kotzin .......................... 455/453 |
| 6,529,733 | B1 | * | 3/2003  | Qing-An ....................... 455/437 |
| 6,765,889 | B1 | * | 7/2004  | Ludwig ......................... 370/331 |
| RE39,119  | E  | * | 6/2006  | Serizawa et al. .............. 455/509 |
| 7,454,210 | B2 | * | 11/2008 | Rinne et al. ................... 455/442 |
| 8,165,083 | B2 | * | 4/2012  | Tani et al. ..................... 370/329 |

(Continued)

FOREIGN PATENT DOCUMENTS

| EP | 1 345 463 A2 | 9/2003 |
| JP | 06-303664 A | 10/1994 |

(Continued)

OTHER PUBLICATIONS

Translation of the JP,2004/057903 Kamura.*

(Continued)

*Primary Examiner* — Joseph Arevalo
(74) *Attorney, Agent, or Firm* — Osha Liang LLP

(57) ABSTRACT

Embodiments of the present invention make it possible to reduce loss and delay of downlink user data transmitted at regular time intervals in a mobile communication system employing a hard handover method, and make it possible to easily perform high-quality handover solely by a handover-starting base station. A base station for transmitting downlink user data at regular time intervals to a mobile station is disclosed. The base station is configured to transmit a handover-command signal immediately after transmitting the downlink user data to the mobile station.

2 Claims, 3 Drawing Sheets

(56) References Cited

U.S. PATENT DOCUMENTS

| | | |
|---|---|---|
| 8,254,935 B2 * | 8/2012 | Tomita et al. ............... 455/442 |
| 2003/0061351 A1 * | 3/2003 | Prathima et al. ............ 709/226 |
| 2003/0086395 A1 | 5/2003 | Shanbhag |
| 2004/0106412 A1 * | 6/2004 | Laroia et al. ................ 455/448 |
| 2004/0111236 A1 * | 6/2004 | Lee et al. .................... 702/179 |
| 2004/0151186 A1 * | 8/2004 | Akama ..................... 370/395.3 |
| 2005/0176432 A1 | 8/2005 | Kamura et al. |
| 2005/0192010 A1 * | 9/2005 | Kirla .......................... 455/438 |
| 2005/0265294 A1 * | 12/2005 | Hu et al. ..................... 370/335 |
| 2005/0266848 A1 * | 12/2005 | Kim ............................ 455/436 |
| 2006/0073836 A1 * | 4/2006 | Laroia et al. ................ 455/450 |
| 2006/0159049 A1 * | 7/2006 | Chung ........................ 370/331 |
| 2006/0159050 A1 * | 7/2006 | Kim et al. ................... 370/331 |
| 2006/0176852 A1 * | 8/2006 | Wu et al. .................... 370/331 |
| 2006/0199586 A1 * | 9/2006 | Yoon .......................... 455/437 |
| 2006/0215592 A1 | 9/2006 | Tomoe et al. |
| 2007/0026881 A1 * | 2/2007 | Tzavidas et al. ............ 455/517 |
| 2007/0064835 A1 * | 3/2007 | Auranen ..................... 375/316 |
| 2007/0086387 A1 * | 4/2007 | Kang et al. .................. 370/331 |
| 2007/0173256 A1 * | 7/2007 | Laroia et al. ................ 455/436 |
| 2007/0224994 A1 * | 9/2007 | Kakishima et al. .......... 455/436 |
| 2008/0192682 A1 * | 8/2008 | Matsumoto et al. ......... 370/328 |
| 2009/0042578 A1 * | 2/2009 | Rinne et al. ................. 455/442 |
| 2009/0279507 A1 * | 11/2009 | Kanazawa et al. ........... 370/332 |
| 2009/0312021 A1 * | 12/2009 | Kim ............................ 455/436 |

FOREIGN PATENT DOCUMENTS

| | | |
|---|---|---|
| JP | 2000092542 A | 3/2000 |
| JP | 2002-191064 A | 7/2002 |
| JP | 2003-47037 A | 2/2003 |
| JP | 2005-27314 A | 1/2005 |
| JP | 2005-260435 A | 9/2005 |
| WO | 98/09454 A1 | 3/1998 |
| WO | 99/65266 A1 | 12/1999 |
| WO | 03073774 A1 | 9/2003 |
| WO | 2004/057903 A1 | 7/2004 |
| WO | 2004/114695 A1 | 12/2004 |

OTHER PUBLICATIONS

International Search Report w/translation from PCT/JP2007/053554 dated May 22, 2007 (4 pages).

Written Opinion from PCT/JP2007/053554 dated May 22, 2007 (3 pages).

Extended European Search report dated Jul. 27, 2012, received in corresponding application No. EP 07714947.4 (6 pages).

Patent Abstracts of Japan publication No. 2000-092542, published Mar. 31, 2000 (1 page).

Chinese Office Action for Chinese Application No. 200780006782.8 dated Sep. 26, 2012 w/ english translation (10 pages).

* cited by examiner

BASE STATION AND HANDOVER CONTROL METHOD

TECHNICAL FIELD

The present invention generally relates to a base station and a handover control method in a mobile communication system.

BACKGROUND ART

In designing a mobile communication system, it is very important to prevent loss of user data during handover between base stations. Especially, if data loss occurs in a real-time application such as voice or videophone communication, it is difficult to compensate for the loss by retransmission of packets and as a result, the quality of voice or video may be degraded.

In IMT-2000 that is an international standard for mobile communication systems, a soft handover method can be employed for handover between base stations. In soft handover, a mobile terminal communicates with the network via two or more base stations at the same time. Therefore, soft handover reduces the possibility of user data loss and makes it possible to perform high-quality handover. For example, patent document 1 discloses a technology for applying soft handover to a mobile station receiving and sending real-time data. However, soft handover requires multiple radio channels for each user and increases the workload of base stations controlling the handover. This in turn may complicate the system architecture and the radio communication control process and thereby increase system costs.

[Patent document 1] Japanese Patent Application Publication No. 2002-191064

DISCLOSURE OF INVENTION

Problems to be Solved by the Invention

In hard handover, unlike in soft handover, a mobile station communicates via a radio channel with only one base station. Because the radio channel is switched to another radio channel at a certain timing during handover, the mobile station may become unable to communicate temporarily. Therefore, to improve the quality of hard handover, it is preferable to reduce the interruption of communication (the period of time during which communication is interrupted) as much as possible. However, because it is necessary to ensure radio synchronization and perform proper radio communication control, completely preventing the interruption of communication is difficult. Thus, when a mobile station performing real-time communications such as voice communication is handed over by hard handover, user data may be lost during the interruption of the communications.

FIG. 1 is a sequence chart used to describe the above problem. In FIG. 1, it is assumed that a real-time service is being provided, and user data (real-time data) are transmitted at regular time intervals via a packet switch and a handover (HO)-starting base station or an HO-destination base station to a mobile station (101). When an event triggering handover occurs (102), the mobile station sends an HO-request signal to the HO-starting base station (103). In response to the HO-request signal from the mobile station, the HO-starting base station sends an HO-command signal to the mobile station (104). When receiving the HO-command signal, the mobile station starts switching radio channels, and as a result, the radio communications are interrupted for a certain period (105). After switching radio channels, the mobile station sends a signal indicating the completion of the switching process to the HO-destination base station (106). Then, the HO-destination base station sends a route-change request signal requesting to change the transfer route of subsequent user data to the packet switch (107). In response to the route-change request signal, the packet switch changes the transfer route of user data for the mobile station (108).

In the above process, user data transmission and handover are processed separately. Therefore, it is possible that the HO-starting base station sends user data while the mobile station is unable to communicate. As a result, the user data may be lost as shown by X in FIG. 1.

Several methods are proposed to prevent loss of data as described above. In a first method, transmission of user data is suspended at a device higher than the base station immediately before handover is performed. In a second method, a device higher than the base station duplicates data and sends the duplicated data to both the HO-starting base station and the HO-destination base station. In a third method, if the HO-starting base station cannot transmit user data, it transfers the user data to the HO-destination base station. However, with the first and third methods, transmission delay of user data increases because of the suspension of data transmission or because of the data transfer. This is especially disadvantageous for a real-time application. Also, all three methods make it necessary to control devices other than the HO-starting base station and therefore make it necessary to define additional control signals and/or control states. This in turn complicates the communication control process and increases system costs.

One object of the present invention is to reduce loss and delay of downlink user data transmitted at regular time intervals in a mobile communication system employing a hard handover method, and to make it possible to easily perform high-quality handover solely by an HO-starting base station.

Means for Solving the Problems

Embodiments of the present invention provide a base station for transmitting downlink user data at regular time intervals to a mobile station. The base station is configured to transmit a handover-command signal immediately after transmitting the downlink user data to the mobile station.

Advantageous Effect of the Invention

Embodiments of the present invention make it possible to reduce loss and delay of downlink user data transmitted at regular time intervals in a mobile communication system employing a hard handover method, and make it possible to easily perform high-quality handover solely by an HO-starting base station.

EXPLANATION OF REFERENCES

201 Mobile station
202 Base station

203 Packet switch
204 Packet network

BEST MODE FOR CARRYING OUT THE INVENTION

Figure 1:
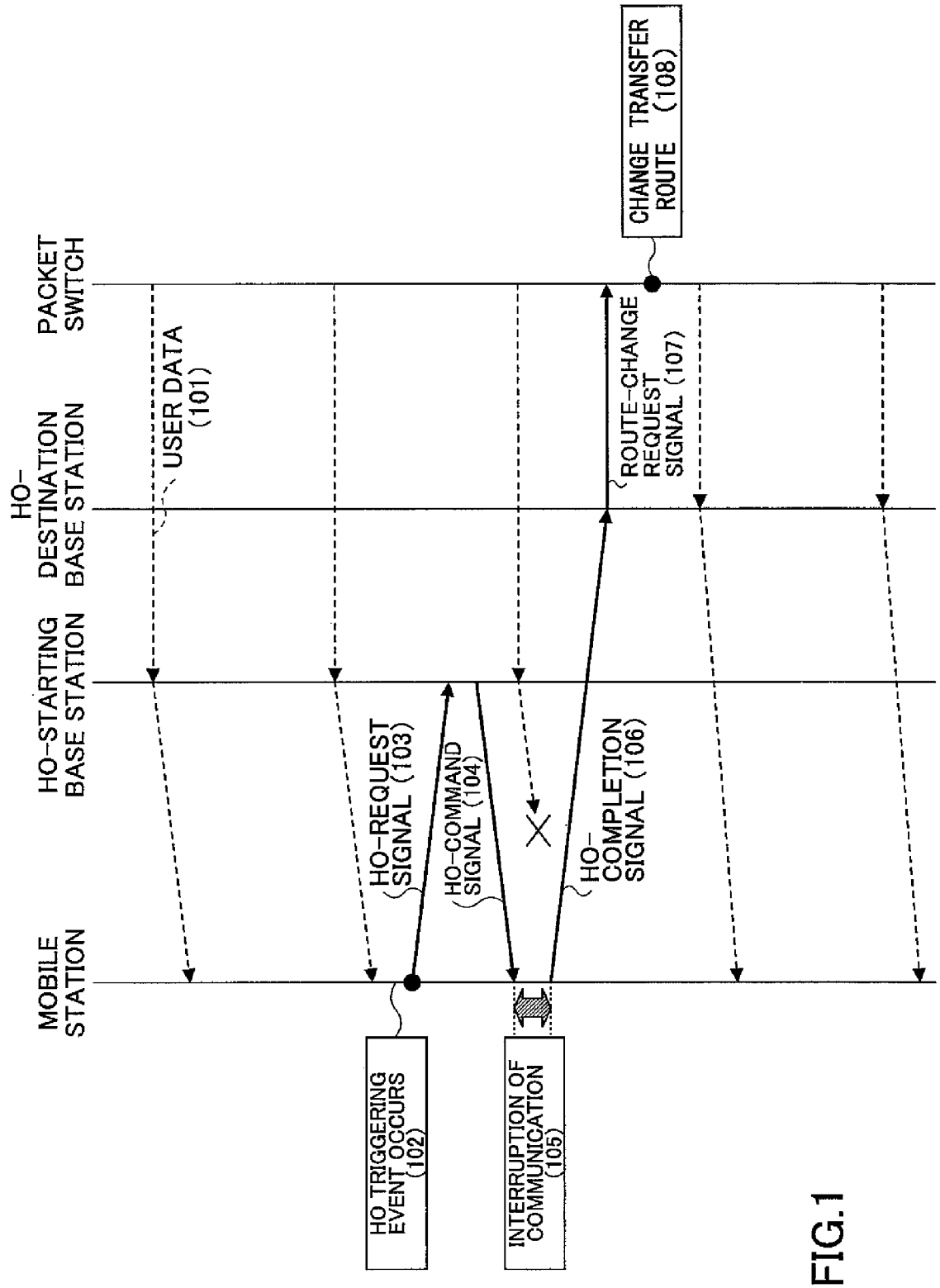
FIG. 1 is a sequence chart showing a conventional handover process between base stations.
Figure 2:
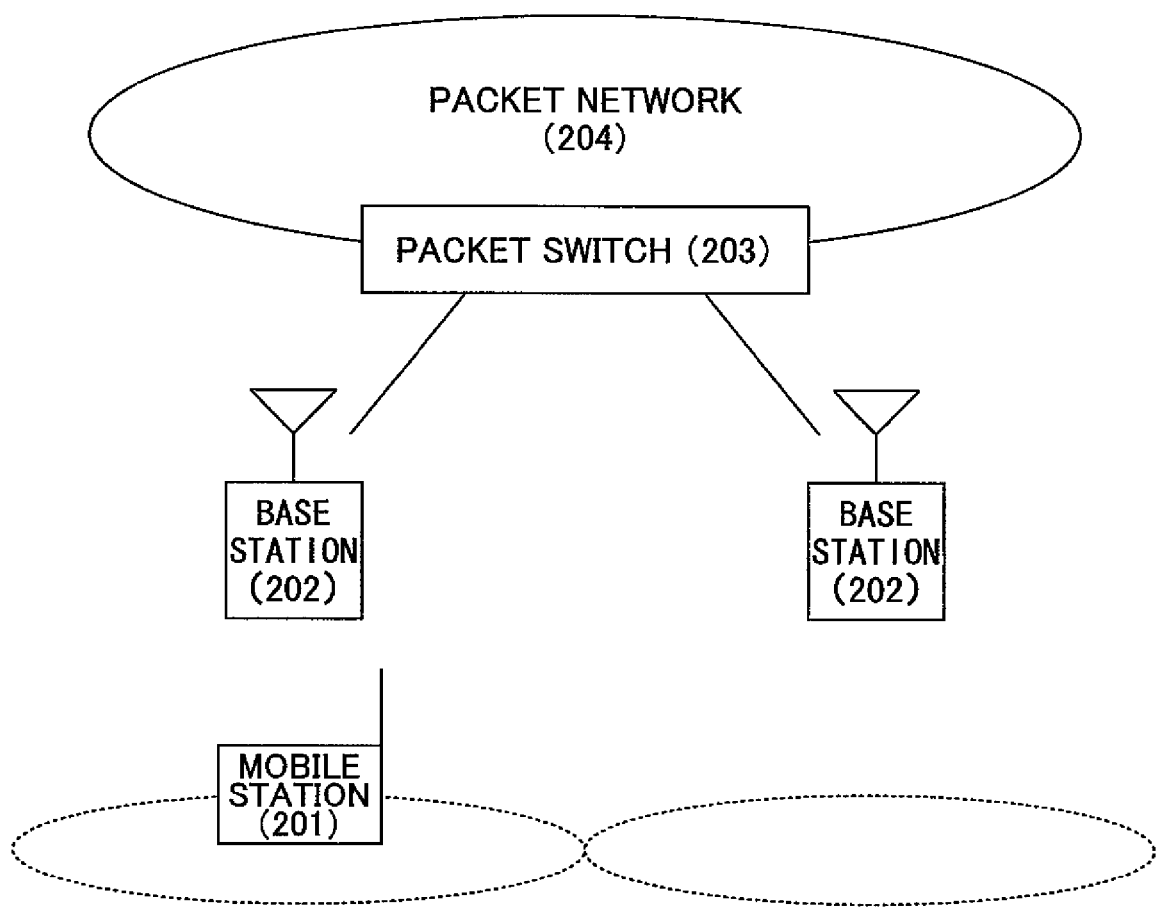
FIG. 2 is a drawing illustrating a mobile communication system according to an embodiment of the present invention.

FIG. 2 shows a mobile communication system according to an embodiment of the present invention. The mobile communication system of FIG. 2 includes a mobile station 201, base stations 202, a packet switch 203, and a packet network 204. The mobile station 201 includes functions of all layers from the physical layer to the application layer. Among others, the mobile station 201 includes radio communication control functions for controlling signal transmission and reception, handover, and so on. In this embodiment, the mobile station 201 can be connected with only one base station at a time, and switches radio channels at a timing specified by the network side during handover. In other words, a hard handover method is used to switch cells or sectors.

Each of the base stations 202 also includes radio communication control functions for controlling signal transmission and reception, handover, and so on. In addition, the base station 202 includes a function for converting wire and wireless communication protocols and a function for transmitting a route-change request to the packet switch. Further, the base station 202 includes a function to suspend the transmission of a handover-command signal until the transmission of downlink user data received after the reception of a handover request signal is completed.

The packet switch 203 includes a function to manage transfer routes of downlink user data. When handover between base stations is performed, the corresponding transfer route is updated.

The packet network 204 uses, for example, the Internet Protocol (IP), and various application service servers and terminals are connected to the packet network 204.

Figure 3:
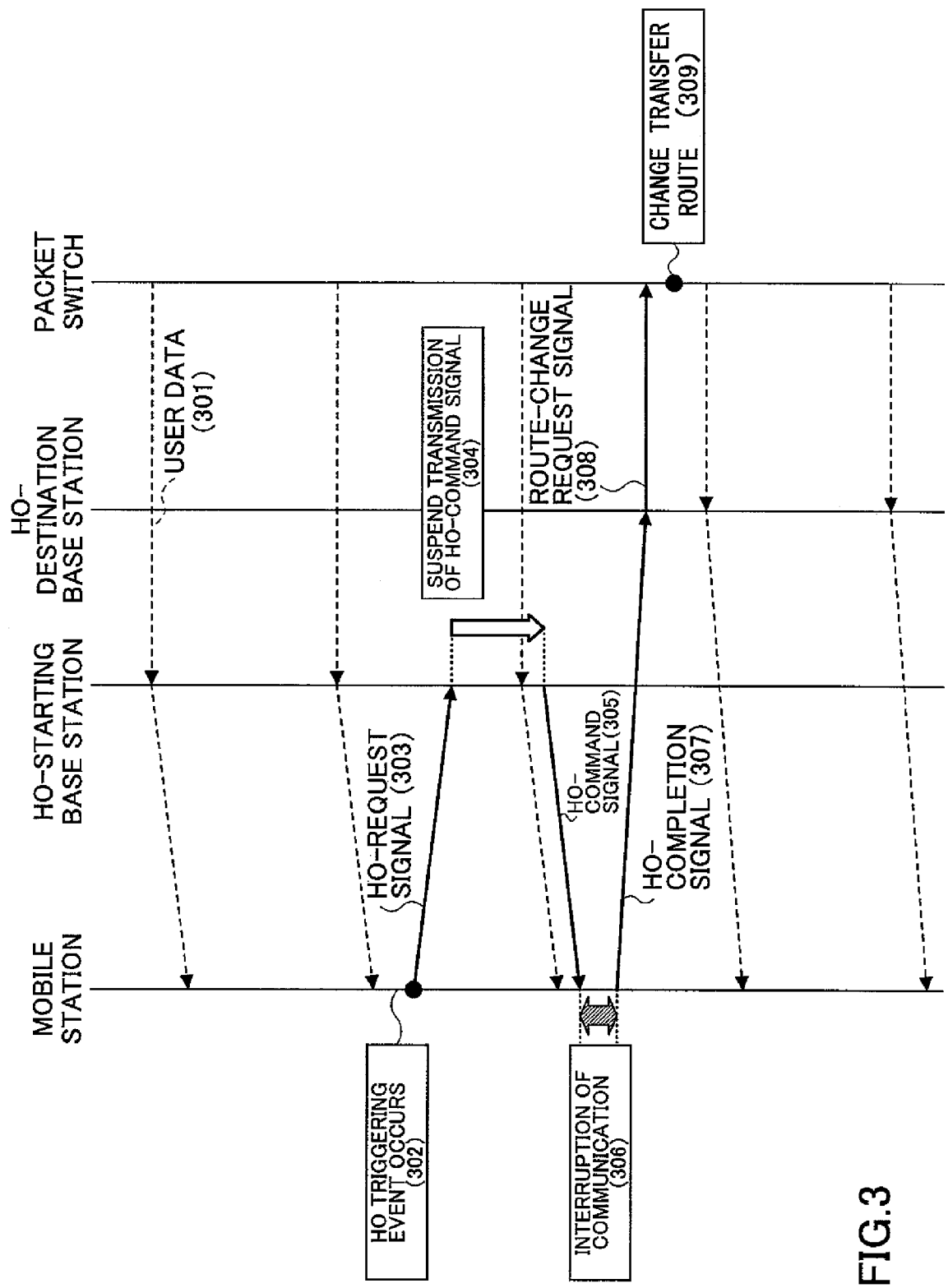
FIG. 3 is a sequence chart showing an exemplary handover process between base stations according to an embodiment of the present invention.

FIG. 3 shows an exemplary handover process between base stations according to an embodiment of the present invention. For brevity, only signals related to the present invention are shown in FIG. 3. However, other control signals may also be transmitted between the constituent devices. In the process shown in FIG. 3, it is assumed that a connection is established between the mobile station and the network, a real-time service is being provided, and downlink user data are being transmitted at regular intervals as shown by dotted arrow lines (301). The data transmission interval may vary depending on the type of service and the specified data rate. In this embodiment, it is assumed that downlink user data are transmitted at 10 ms intervals. The user data are, for example, voice communication data, videophone data, or streaming data.

When an event triggering handover (HO) occurs (302), the mobile station sends an HO-request signal to the HO-starting base station (303). In this embodiment, a mobile-station-assisted handover method is used. In this method, the mobile station measures the levels of signals from neighboring base stations and reports the measured levels to the network. The HO-destination base station and the timing of handover are specified by the network side.

Instead of transmitting an HO-command signal immediately after receiving the HO-request signal, the HO-starting base station suspends the transmission of the HO-command signal until it completes the transmission of the next downlink user data to the mobile station (304). In this regard, this embodiment differs greatly from conventional methods where the HO-command signal is transmitted immediately after the HO-request signal is received. In this embodiment, the HO-starting base station transmits downlink user data to the mobile station, receives the HO-request signal from the mobile station, transmits the next downlink user data to the mobile station, and then transmits the HO-command signal to the mobile station (305).

When receiving the HO-command signal, the mobile station starts switching radio channels, and as a result, the radio communication is interrupted for a certain period (306). After switching radio channels, the mobile station sends a signal indicating the completion of the switching process to the HO-destination base station (307). Then, the HO-destination base station sends a route-change request signal requesting to change the transfer route of subsequent user data to the packet switch (308). In response to the route-change request signal, the packet switch changes the transfer route of user data for the mobile station (309). With this step, the handover process is completed, and the subsequent user data are transmitted via the changed transfer route, i.e. via the HO-destination base station, to the mobile station.

Thus, this embodiment makes it possible to effectively prevent transmission of real-time data from the HO-starting base station to the mobile station during a period (during a handover process) from when the communication of the mobile station is interrupted until the packet switch changes the transfer route. In other words, this embodiment makes it possible to ensure that a handover process is completed during a transmission interval of real-time data. Note that, in this embodiment, it is assumed that the transmission interval of real-time data is longer than the time required for a handover process.

When applying the present invention to a conventional mobile communication system, it is necessary to make the HO-starting base station delay the transmission of the HO-command signal until it completes transmission of the next user data. This configuration or method eliminates the need to define additional control signals for communications with nodes other than the HO-starting base station, and makes it possible to perform high-quality handover by just modifying the HO-starting base station.

Meanwhile, the transmission timing of uplink user data may come during the interruption of communication. In this case, however, loss of data can be easily prevented by causing the mobile station to buffer the uplink user data.

The present international application claims priority from Japanese Patent Application No. 2006-50435 filed on Feb. 27, 2006, the entire contents of which are hereby incorporated herein by reference.

The invention claimed is:

1. A base station for transmitting downlink user data at regular transmission intervals to a mobile station, the base station comprising:
   a radio communication control function;
   wherein when receiving a handover request signal from the mobile station, in response to an event triggering handover, and after transmitting the downlink user data to the mobile station at one of the regular transmission intervals, the radio communication control function is configured to suspend transmission of a handover-command signal for a first time period, in response to the handover request signal until the transmission of the downlink user data to the mobile station at a next one of the regular transmission intervals is completed; and
   wherein when receiving the handover-command signal, the mobile station starts switching radio channels, and as a result, radio communication is interrupted for a second time period;
   wherein, after finishing switching radio channels, the mobile station sends a handover-completion signal, indicating the completion of the switching process, to a handover-destination base station; and wherein, in response to the handover completion signal, the handover-destination base station sends a route-change request signal to a packet switch.

2. A handover control method used by a base station for transmitting downlink user data at regular transmission intervals to a mobile station, the method comprising:

when receiving a handover request signal from the mobile station, in response to an event triggering handover, and after transmitting the downlink user data to the mobile station at one of the regular transmission intervals, suspending transmission of a handover-command signal for a first time period, in response to the handover request signal, until the transmission of the downlink user data to the mobile station at a next one of the regular transmission intervals is completed; and wherein when receiving the handover-command signal, the mobile station starts switching radio channels, and as a result, radio communication is interrupted for a second time period;

wherein, after finishing switching radio channels, the mobile station sends a handover-completion signal, indicating the completion of the switching process, to a handover-destination base station; and wherein, in response to the handover completion signal, the handover-destination base station sends a route-change request signal to a packet switch.

* * * * *